(12) United States Patent  (10) Patent No.: US 9,132,866 B2
Endrich et al.  (45) Date of Patent: Sep. 15, 2015

(54) CAP FOR VEHICLE BODY HOLLOW SPACES WITH INTEGRATED FUNCTION PART

(75) Inventors: Werner Endrich, Bensheim (DE);
Bernd Pohl, Muenster-Sarmsheim (DE);
Stefan Stanik, Bruchkoebel (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 24 days.

(21) Appl. No.: 13/275,412

(22) Filed: Oct. 18, 2011

(65) Prior Publication Data
US 2012/0091755 A1   Apr. 19, 2012

(30) Foreign Application Priority Data

Oct. 19, 2010 (DE) .......................... 10 2010 048 862

(51) Int. Cl.
*B62D 25/00* (2006.01)
*B62D 29/00* (2006.01)

(52) U.S. Cl.
CPC ......... *B62D 29/002* (2013.01); *Y10T 137/6881* (2015.04)

(58) Field of Classification Search
CPC .................................................... B62D 29/002
USPC .......... 296/187.01, 187.02, 209, 1.06, 193.06
See application file for complete search history.

(56) References Cited

U.S. PATENT DOCUMENTS

| 7,621,373 | B2 | 11/2009 | Helferty |
| 7,726,442 | B2 | 6/2010 | Belpaire |
| 8,113,572 | B2* | 2/2012 | Mildner et al. ............... 296/209 |
| 2010/0140981 | A1 | 6/2010 | Mildner et al. |

FOREIGN PATENT DOCUMENTS

| DE | 10049226 A1 | 4/2002 |
| DE | 102006014963 A1 | 10/2007 |
| DE | 102008049758 A1 | 4/2010 |
| EP | 1134126 A2 | 9/2001 |
| WO | 2009053462 A1 | 4/2009 |

OTHER PUBLICATIONS

German Patent Office, German Search Report for Application No. 102010048862.3, dated Jun. 6, 2011.
British Patent Office, British Search Report for Application No. 1113466.5, dated Dec. 2011.

* cited by examiner

*Primary Examiner* — Melissa A Black
(74) *Attorney, Agent, or Firm* — Ingrassia Fisher & Lorenz PC

(57) ABSTRACT

A vehicle body and a cap are provided for closing off a hollow space formed by one or more structural components of a motor vehicle body with a carrier plate configured to the geometry of the hollow space, whose outer edge is provided with a thermally activatable sealant and/or adhesive and at least one function part is embedded in the carrier plate.

23 Claims, 6 Drawing Sheets

B-B

CAP FOR VEHICLE BODY HOLLOW SPACES WITH INTEGRATED FUNCTION PART

CROSS-REFERENCE TO RELATED APPLICATION

This application claims priority to German Patent Application No. 102010048862.3, filed Oct. 19, 2010, which is incorporated herein by reference in its entirety.

TECHNICAL FIELD

The technical field relates to a cap for closing at least one hollow space formed by one or a plurality of structural components of a motor vehicle body.

BACKGROUND

Components of a motor vehicle body, particularly load-bearing structural components such as for example side members, side sills as well as various pillar structures, such as for example A, B or C-pillars as well as door hinge pillars provided in extension thereon are by themselves designed as hollow chamber profiles or form individual or a plurality of hollow spaces in the connecting region to adjoining load-bearing structural components. Depending on the design and position of the body components forming the hollow space it is advisable to close off the respective hollow space in order to for example protect the body hollow profile portion concerned against entering dirt and moisture.

From DE 10 2008 049 758 A1 a cap manufactured of plastic for covering at least one of the ends of a lateral sill of a motor vehicle body is known. An end wall of the termination part in this case covers a plate of a sill reinforcement arranged within the hollow profile. The termination part in this case can comprise a circumferential channel with an adhesive or plastic foam arranged therein. When painting the motor vehicle body this foam can expand in a drying oven and thus seal a gap between the termination part and the inner side of the sill. Especially in the region of the side sill of a motor vehicle body it is additionally required to discharge condensation accumulated for example within the sill structure.

Therefore, at least one objective is to provide an improved cap for the closing off and/or sealing off hollow spaces of a motor vehicle body, by means of which the assembly of the body can be simplified and material and manufacturing costs reduced. In addition, the cap is to have an increased functionality. In addition, other objectives, desirable features and characteristics will become apparent from the subsequent summary and detailed description, and the appended claims, taken in conjunction with the accompanying drawings and this background.

SUMMARY

A cap is designed for the closing off of a hollow space formed by one or a plurality of structural components of a motor vehicle body. In this regard, it comprises a carrier plate adapted to the geometry of the respective hollow space to be closed off. At least the outer edge of said carrier plate is provided with a thermally activatable sealant and/or adhesive. By means of the sealant and/or adhesive the cap can seal off a gap formed between itself and the structural component or components, thus closing off said gap air and/or water tight. Furthermore, at least one function part is embedded in the carrier plate, which provides functions that go beyond a mere hollow space sealing and serves for the optimization of the cap, its sealing function and the body assembly.

The function part is sunk into the carrier plate at a predetermined point and is more preferably fully functional even after a thermal activation of the sealant and/or adhesive. In particular, the function part is completely integrated in the cap and therefore does not need to be separately fastened to the cap or separately fastened to the structural components of the motor vehicle body. In an embodiment, the function part is designed for example as water drain valve. It is preferably integrated in the carrier plate at a low lying point with respect to the cross-sectional profile of the hollow space, so that any liquids entering the hollow space or present after a painting process as well as any condensate subsequently forming can drain out of the hollow space. Therefore, the integration of the water drain valve in the carrier plate of the cap is provide in a separate assembly of the water drain valve can be advantageously omitted.

In a further embodiment thereof it can be additionally provided to design the function part as fastening means for further body components. Thus, the function part can more preferably assume the function of for example fastening nuts, such as cage nuts or weld nuts, so that further preferably not load-bearing but for example merely covering body components can be fastened over the cap and its function part integrated therein can be fastened to load-bearing structural components of the motor vehicle body. In this case, the function part is by no means restricted to screw connections, but can correspond with all fastening means usual for the fastening of body components in a positive, non-positive and/or frictionally connected manner.

In an embodiment it is thereby additionally provided that the carrier plate facing a boundary wall of the hollow space comprises a channel that is open towards the wall for receiving the sealant and/or adhesive. The channel provided for receiving the thermally activatable sealant and/or adhesive which is open towards the edge of the carrier plate allows a thermally induced spatial expansion of the sealant and/or adhesive so that the latter can adequately close off one or a plurality of gaps located between the carrier plate and the inner boundary of the hollow space. Here, the carrier plate is designed and dimensioned with respect to its outer dimensions such that upon insertion of the cap in the hollow space at least in certain regions an edge-sided gap is formed, which is only closed off during the course of the thermally induced geometrical expansion of the sealant and/or adhesive. Such a gap proves advantageous particularly during the execution of a cathodic dip painting process (KTL), since all parts of the body in white can be completed wetted upon immersion in the KTL bath. Maintaining an intended gap dimension between cap and the adjoining body components additionally makes possible the draining of possible priming or painting liquids, before the painted body is exposed to a thermal treatment for drying purposes.

In a further embodiment the carrier plate is designed as plastic injection molded component, wherein furthermore the thermally activatable sealant and/or adhesive can also be attached to the carrier plate during the course of a multi-component injection molding process. Depending on the sealant and/or adhesive used, it can thereby be additionally provided that the carrier plate is provided with sealant and/or adhesive compound not only on the edge-side, but also over its cross section and beyond. Particularly when using a structural adhesive the inherent strength and stiffness of the carrier plate can be reinforced in this manner through thermal activation of the structural adhesive used and accordingly improved. Here, the cap itself can be designed as structure-reinforcing component which preferentially with its entire outer edge joins up with one or with a plurality of wall portions of body structural components, supporting it thereon.

In a further embodiment a motor vehicle body is provided with a plurality of structural components comprising a hollow space and/or forming a hollow space. A previously described cap is adapted to the cross-sectional geometry of the hollow space and designed to close off the hollow space in a sealing manner. The cap in this case is to be preferably arranged by means of at least one fastening element in a pre-assembly position within the hollow space, preferably subject to the formation of an edge-sided gap, so that structural components adjoining the hollow space and/or forming the hollow space can be preferably completely wetted with provided priming and painting means during the course of a painting process. In a drying process following the painting process a thermal activation of the sealant and/or adhesive provided on the cap finally takes place, so that any gaps can be closed off in a gas and/or liquid-tight manner. Hereby it is more preferably provided that the cap following a thermal activation with its sealant and/or adhesive provided on the outer edge is structurally connected to the structural component or to the structural components. The cap itself in this regard forms a component reinforcing or structurally stiffening the cross-sectional geometry of the hollow space.

A pre-fixing of the cap in the region of the hollow space cross section preferably takes place via one or a plurality of fastening straps protruding into the hollow space, which are merely designed in order to fix the cap in an intended position pending the completion of the thermal activation of the sealant and/or adhesive. A mutual fastening of cap and the structural components of the motor vehicle body adjoining the hollow space however preferably is effected exclusively via the edge-sided sealant and/or adhesive.

Within the motor vehicle body, the function part integrated in the cap can for example serve as fastening means for a panel part of the motor vehicle body. A panel part, such as for example a wheel housing or a fender can be fastened via the function part of the cap to the function part itself and finally also via the function part to the load-bearing components of the motor vehicle body enclosing the function part. The cap can seal off to the outside a multiplicity of different hollow spaces of the motor vehicle body, for example the hollow profile of a side sill.

According to a further embodiment the cap closes off for example a hollow space formed by a side wall outside and by a door hinge pillar, wherein the side wall outside typically extends over the outer side of a side sill of the vehicle body and the door hinge pillar at least in certain regions extends parallel to the side wall outside, for example in vehicle longitudinal direction. At least the portions of the side wall outside and of the door hinge pillar running offset relative to each other in vehicle longitudinal direction can be connected in this case with the previously described cap for the sealing of the hollow space formed by the mentioned components.

In another embodiment it is additionally provided that the cap closes off a hollow space formed by a side wall outside and by a side sill. Here, the cap can be additionally designed to close off both the first hollow space formed by the side wall outside and by the door hinge pillar as well as a second hollow space formed by the side wall outside and side sill profile. Thus, with only a simple cap, a plurality of body hollow spaces can be simultaneously closed off by means of sealant and/or adhesive to be thermally activated.

According to a further embodiment the function part designed as fastening means can come to lie in the region of a fastening opening of a structural component forming the hollow space or adjoining the hollow space. In this manner, a fender fastening to the structural component can be effected for example in such a manner that fender-sided fastening means penetrate the structural component, for example the side wall outside, in the region of the fastening opening and located inside engaged in one or a plurality of fastening means embedded in the cap, for example in one or a plurality of threaded sleeves. In this manner, the use of a weld or cage nut to be provided on the inside of the side wall outside can be omitted subject to the reduction of the component and assembly expenditure.

According to a further embodiment a motor vehicle is additionally provided which comprises a previously described motor vehicle body and/or a previously described cap for the sealing of one or a plurality of body hollow spaces.

BRIEF DESCRIPTION OF THE FIGURES

The description is presented in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or the following detailed description.

Figure 1:
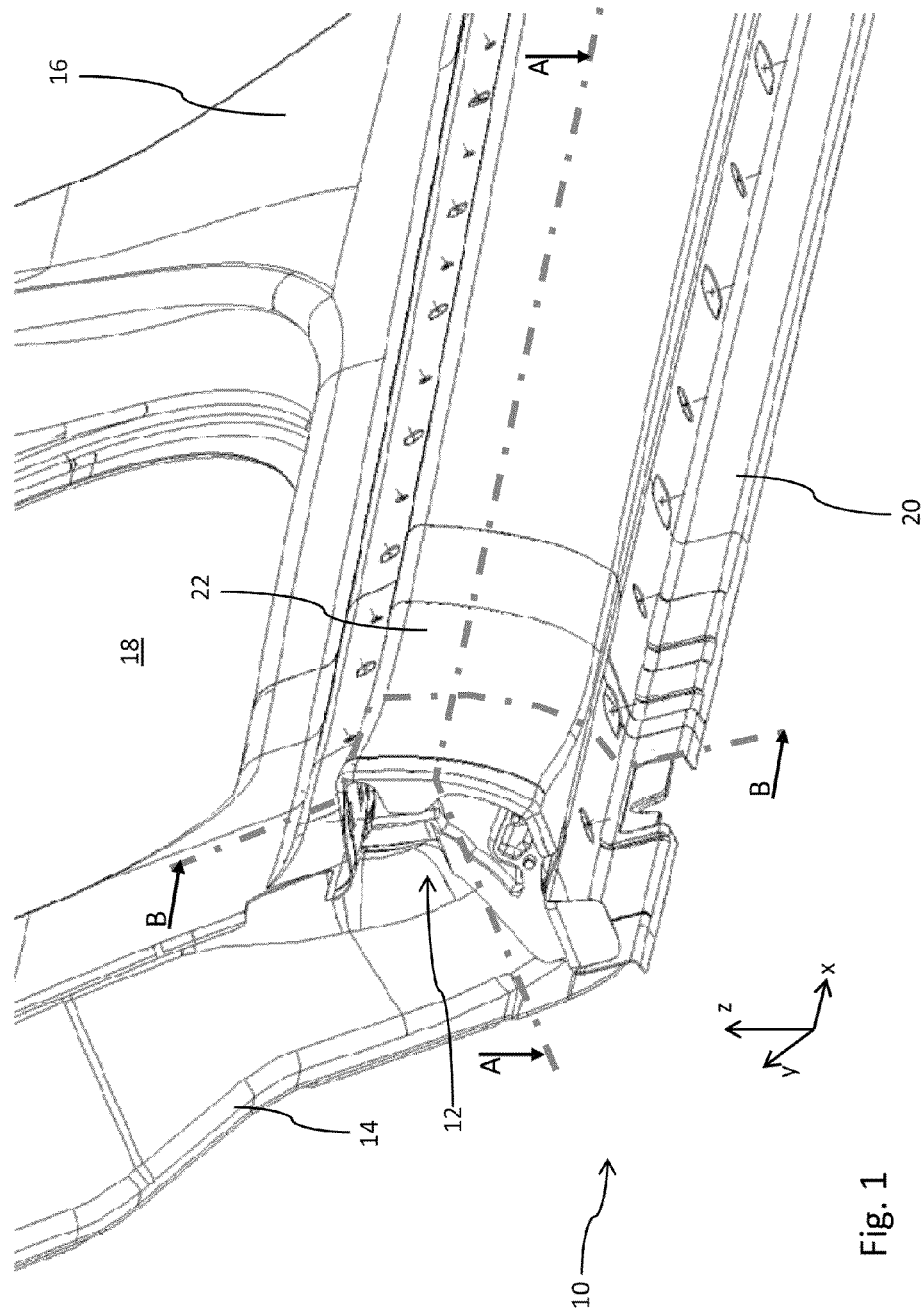
FIG. 1 is a perspective representation of the transition region from a door hinge pillar into a side sill structure from obliquely below.
Figure 2:
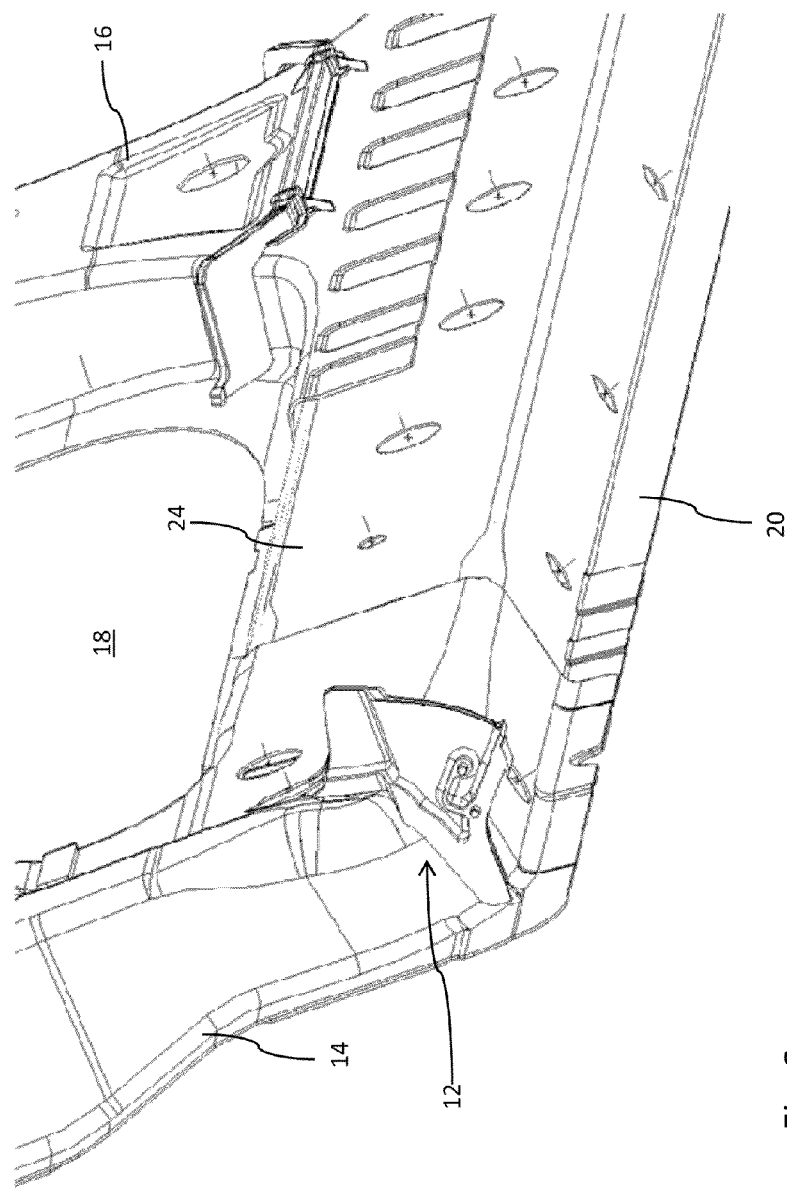
FIG. 2 is the representation according to FIG. 1 with removed side wall outside.
Figure 6:
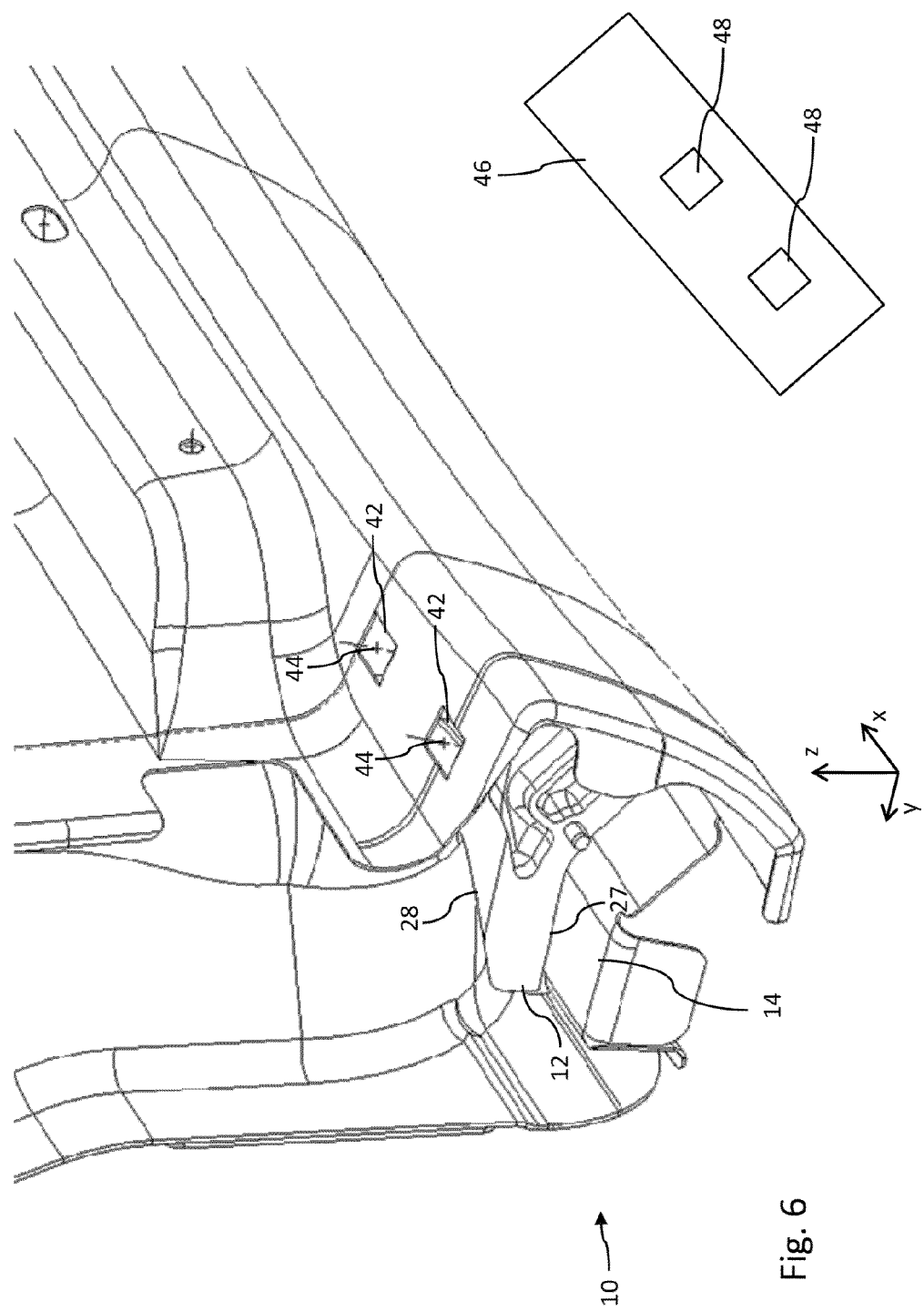
FIG. 6 is a further perspective representation of the arrangement according to FIG. 1.

The motor vehicle body 10 shown in the FIG. 1, FIG. 2 and FIG. 6 in various perspective representations comprises a door hinge pillar 14 substantially running in vehicle vertical direction (z) and a B-pillar 16 spaced there from in vehicle longitudinal direction (x) and delimiting a door opening 18. The door hinge pillar 14 as well as the B-pillar 16 is connected to a sill outer panel 24 substantially running in vehicle longitudinal direction (x).

Figure 5:
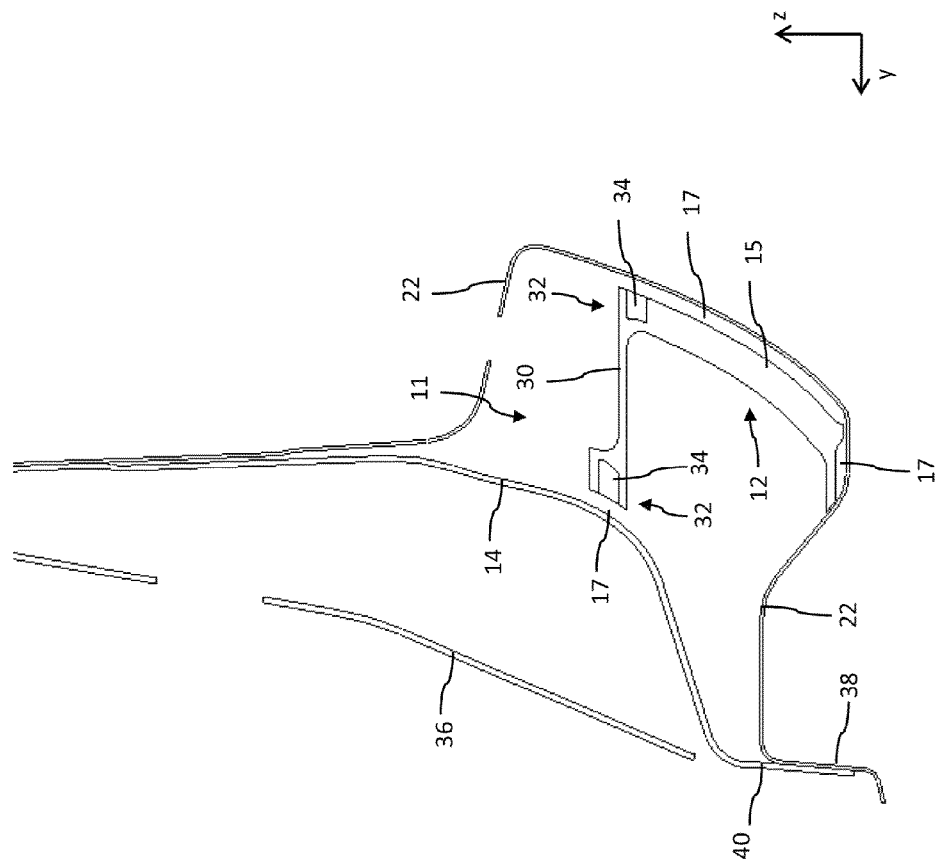
FIG. 5 is a representation along the section line B-B of FIG. 1.

Seen in vehicle longitudinal direction the side wall outer panel 22 largely covers the sill outer panel 24. It extends forward, in FIG. 6 facing the beholder, even beyond the sill outer panel 24. The panel of the door hinge pillar 14 forms a hollow space 11 with the side wall outer panel 22, as is shown in FIG. 5. Lower connecting flange portions 40, 38 of the door hinge pillar 14 and of the side wall outer panel 22 come in contact in the process as is the case also for panel portions which come to lie above the hollow space 11 and which are not designated in more detail here.

In the region of the hollow space 11 a cap 12 adapted to the hollow space geometry is provided. This cap has a comparatively complex geometry and is formed by an injection molded carrier plate which comprises a plurality of regions, for example vertical surface portions 13, 15 as well as a base portion 30 substantially extending in the x-y plane. The cap 12 furthermore comprises an edge 32 that is designed in the manner of a channel and open towards the outside, which is filled with a thermally activatable sealant and/or adhesive 34.

The cap 12 can for example be inserted in the hollow space 11 in a pre-assembly position shown in FIG. 5, so that between the circumferential edge 32 and the inner side of the structural components 14, 22 forming the hollow space 11 a predetermined gap 17 is maintained. On exceeding a predetermined reaction temperature the melt adhesive 34 present in the channel 32 and preferentially based on polyurethane 34 can expand spatially in such a manner that the hollow space 17 formed between the body panels 14, 22 and the cap 12 is substantially closed off in a gas and/or liquid-tight manner.

Figure 3:
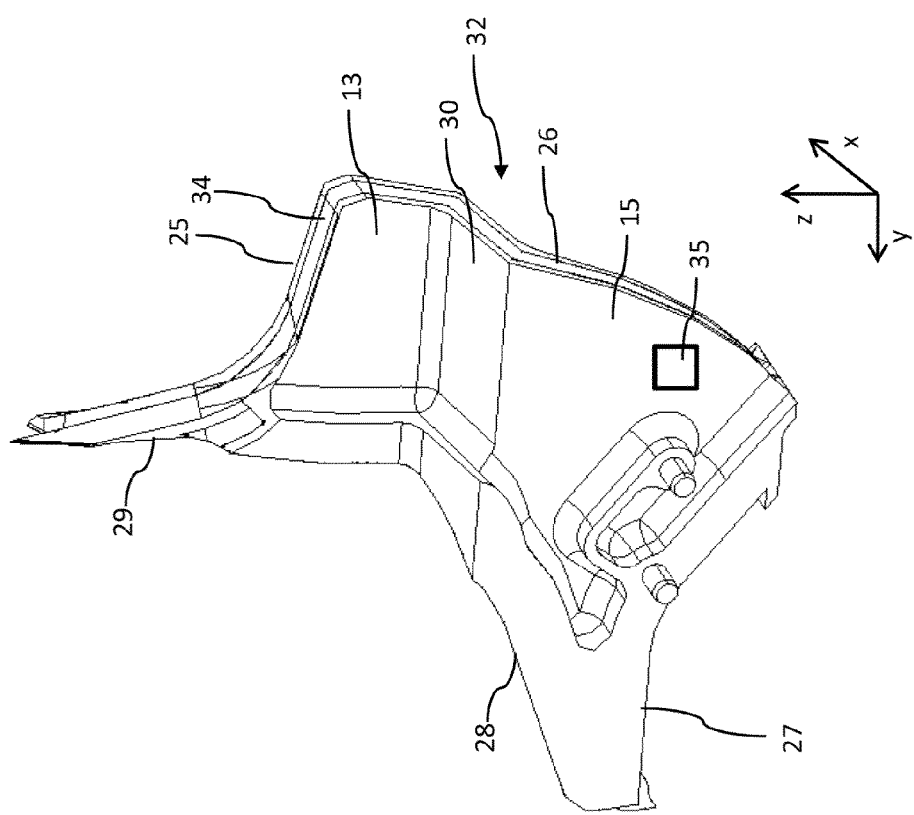
FIG. 3 is an isolated representation of the cap.

The circumferential edge 32 of the cap 12 is sub-divided into five portions 25, 26, 27, 28 and 29 in the representation according to FIG. 3. With the edge portions 28, 29 the cap 12 for example adjoins the outer side of the door hinge pillar 14, while the edge portions 25, 26, 27 come to lie on the inside of the side wall outside 22.

In the representation according to FIG. 3 a water drain valve 35 is integrated in a portion located relatively low in vehicle vertical direction (z) relative to the installation position later on of the surface portion 15 of the cap 12 extending in the y-z plane, via which any condensate present in the hollow space 11 can be discharged to the outside. The drain valve 35 in this case is designed as integral component of the carrier plate 15 and can for example be embedded in the cap 12 even during its manufacture during the course of a multi-component injection molding process.

In addition, the cap 12 can be provided with one or with a plurality of fastening means 44 indicated in FIG. 6 each adjoining the bottom side of the side wall outside 22, which according to the representation in accordance to FIG. 6 come to lie approximately in alignment with a fastening opening 42 formed in the side wall outer panel 22. On the part of the cap 12 the fastening means 44 are for example designed as threaded sleeves 44, which are embedded in the material of the carrier plate 13, 15, 30 even during the course of the injection molding process for manufacturing the cap 12.

Since such fastening means 44 designed as threaded sleeves and sunk into the cap in a rotationally fixed manner come to lie in the region of the fastening opening 42 of the side wall panel 22 a body panel part 46 merely shown schematically in FIG. 6 for example can be directly fastened to the side wall outside 22 with screws 48 corresponding therewith. The provision of separate fastening nuts, for example cage or weld nuts on the inside or lower side of the side wall outside 22 can thus be advantageously omitted.

Figure 4:
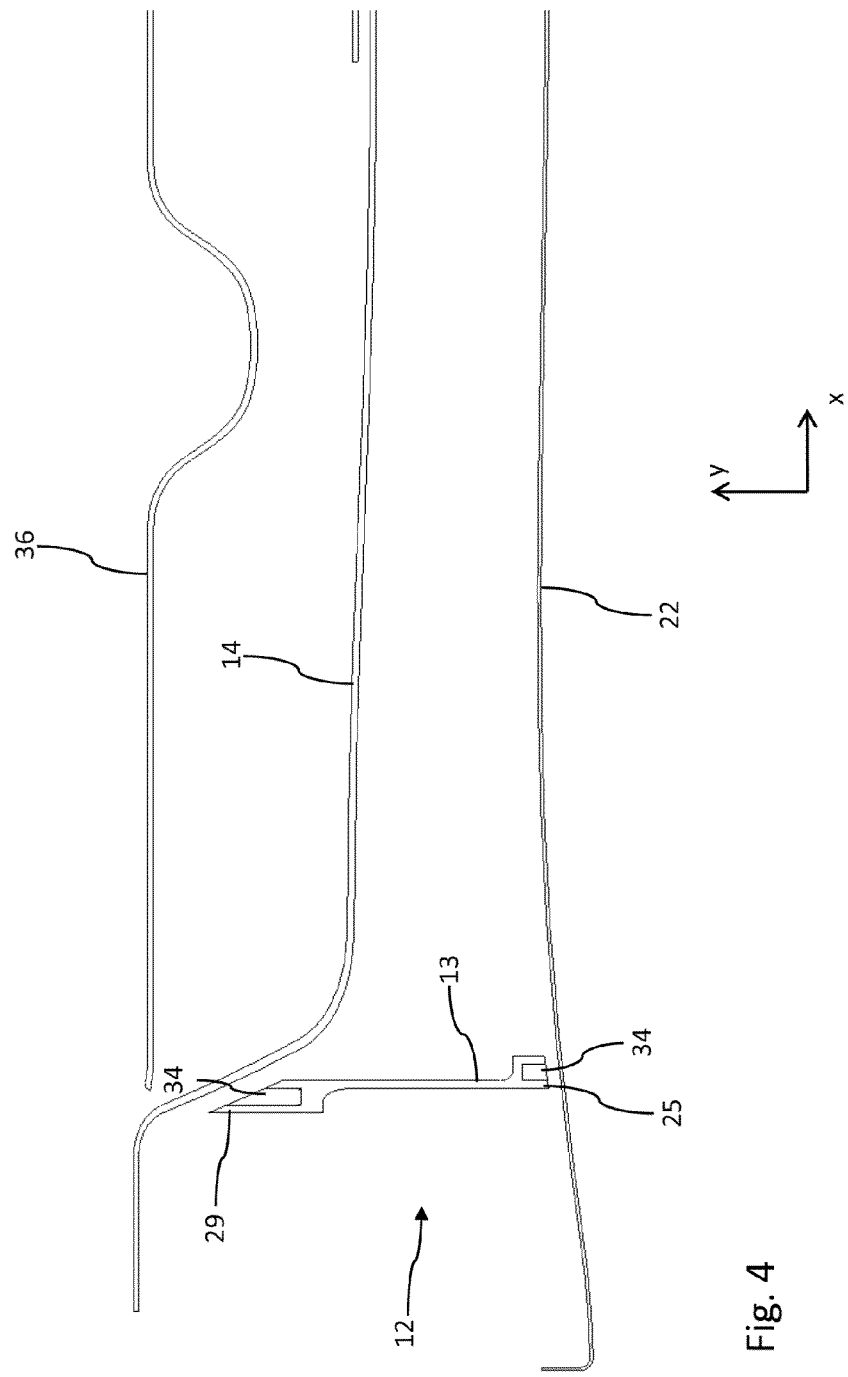
FIG. 4 is a sectioned representation of the structure shown in FIG. 1 along the section line A-A.

In the cross section according to FIG. 4 the sealing function of the cap 12 is illustrated in a further cross section. Here, the cap 12 with its tapering surface portion 13 protruding upwards in FIG. 3 comes to more preferably bear against the edge portions 29 respectively 25 provided there between the door hinge pillar 14 and the side wall outer panel 22. Located further inside a reinforcing plate 36 is additionally provided in vehicle transverse direction (y), which reinforces a jack receiving region of the vehicle body.

As is furthermore evident by means of FIG. 3 the two surface portions of the carrier plate 13, 15 extend approximately in parallel, but offset to each other in vehicle longitudinal direction (x). Based on FIG. 6 the upper portion 13 comes to lie offset in vehicle longitudinal direction (x) compared to the lower portion 15 so that the function parts 44 provided on the upper portion of the carrier plate 13, for example for receiving fastening screws 48 of a body panel part 46 are arranged on the place of installation provided for this and located inside on the side wall outer panel 22.

The depicted embodiments merely show a possible configurations with regard to which numerous versions are conceivable and are within the scope as set forth in the claims. The exemplarily shown exemplary embodiments must not be interpreted as being restrictive in any manner with regard to the scope, the applicability or the configuration possibilities. The present description merely shows the person skilled in the art a possible implementation of an exemplary embodiment. Thus a great many modifications in the function and arrangement of described elements can be carried out without leaving the scope of protection or its equivalents defined by the following claims by doing so.

What is claimed is:

1. A cap that is configured to be inserted into and to close off a cavity of a motor vehicle body, wherein the cavity is formed by a panel of a door hinge pillar having an outer side and a side wall outer panel having an inside portion, the cap comprising:
    a carrier plate configured to a geometry of the cavity, the carrier plate comprising:
       an outer edge comprising: a first edge portion that is configured to lie on the inside portion of the side wall outer panel; a thermally activatable sealant that fills at least the first edge portion of the outer edge;
       a valve embedded in the carrier plate; and
       a function part integrated in the cap, wherein the function part serves as a fastener that comprises a plurality of threaded sleeves embedded in the carrier plate, wherein the fastener is configured to directly fasten a panel part of the motor vehicle to the side wall outer panel.

2. The cap according to claim 1, wherein the thermally activatable sealant is an adhesive.

3. The cap according to claim 1, wherein the valve is a water drain valve.

4. The cap according to claim 1, wherein the carrier plate faces a boundary wall of the cavity and further comprises:
    a channel open towards the boundary wall that is configured to receive the thermally activatable sealant.

5. The cap according to claim 1, wherein the carrier plate is a plastic injection molded component.

6. A motor vehicle body, comprising:
    a plurality of structural components, comprising: a side wall outer panel and a door hinge pillar that that form a hollow space; and
    a cap configured to a cross-sectional geometry of the hollow space and configured to close off the hollow space, the cap comprising:
       a carrier plate configured to a geometry of the hollow space, the carrier plate comprising:
          an outer edge comprising: a first edge portion that lies on the inside portion of the side wall outer panel;
          a thermally activatable sealant that fills at least the first edge portion of the outer edge; and
          a function part integrated in the cap, wherein the function part serves as a fastener that comprises a plurality of threaded sleeves embedded in the carrier plate that are configured to directly fasten at least one panel part of the motor vehicle to the side wall outer panel, wherein the at least one panel part is configured to fasten to at least one of the plurality of structural components via the fastener.

7. The motor vehicle body according to claim 6, wherein the cap is almost exclusively structurally connected to the plurality of structural components via a circumferential thermally activatable sealant provided on the outer edge.

8. The motor vehicle body according to claim 6, further comprising:
a side sill, wherein the side wall outer panel extends over an outer side of the side sill and the door hinge pillar, and wherein the cap is further configured to close off the hollow space formed by the side wall outer panel and by the side sill.

9. The motor vehicle body according to claim 6, wherein the valve is a fastener that comes to lie in a region of a fastening opening of a structural component forming the hollow space.

10. The motor vehicle body according to claim 6, wherein the thermally activatable sealant is an adhesive.

11. The motor vehicle body according to claim 6, wherein the valve is a water drain valve.

12. The motor vehicle body according to claim 6, wherein the carrier plate further comprises:
a fastener that is configured to fasten a body component.

13. The motor vehicle body according to claim 6, wherein the carrier plate faces a boundary wall of the hollow space and further comprises:
a channel open towards the boundary wall that is configured to receive the thermally activatable sealant.

14. The motor vehicle body according to claim 6 wherein the carrier plate is a plastic injection molded component.

15. A motor vehicle body, comprising:
a plurality of structural components comprising: a side wall outer panel and a door hinge pillar that form a hollow space; and
at least one panel part; and
a cap configured to a cross-sectional geometry of the hollow space, wherein the cap is configured to close off the hollow space, the cap comprising:
a carrier plate configured to a geometry of the hollow space, the carrier plate comprising:
an outer edge comprising: a first edge portion that lies on the inside portion of the side wall outer panel;
a thermally activatable sealant that fills at least the first edge portion of the outer edge;
a fastener configured to fasten a body component to the sidewall outer panel;
a function part integrated in the cap, wherein the function part serves as a fastener that comprises a plurality of threaded sleeves embedded in the carrier plate that are configured to directly fasten at least one panel part of the motor vehicle to the side wall outer panel, and wherein the at least one panel part is configured to fasten to at least one of the plurality of structural components via the fastener.

16. The motor vehicle body according to claim 15, wherein the cap is almost exclusively structurally connected to the plurality of structural components via a circumferential thermally activatable sealant provided on the outer edge.

17. The motor vehicle body according to claim 15, wherein the thermally activatable sealant is an adhesive.

18. The motor vehicle body according to claim 15, wherein the valve is a water drain valve.

19. The motor vehicle body according to claim 15, wherein the carrier plate faces a boundary wall of the hollow space and further comprises:
a channel open towards the boundary wall that is configured to receive the thermally activatable sealant.

20. The cap according to claim 1, wherein the outer edge further comprises:
a second edge portion that is configured to adjoin the outer side of the door hinge pillar, wherein the thermally activatable sealant fills the second edge portion of the outer edge.

21. The cap according to claim 1, wherein the panel part is a wheel housing.

22. The cap according to claim 1, wherein the panel part is a body panel part.

23. The motor vehicle body according to claim 15, wherein the plurality of threaded sleeves are sunk into the cap in a rotationally fixed manner, and are in alignment with a fastening opening formed in the sidewall outer panel and adjoining a bottom side of the sidewall outer panel, the threaded sleeves being configured to directly fasten the panel part to the sidewall outer panel with screws.

* * * * *